May 16, 1950     W. C. FRANCIS     2,507,776
DRILL BIT

Filed Sept. 3, 1946

W. C. FRANCIS
INVENTOR

ATTORNEYS

Patented May 16, 1950

2,507,776

UNITED STATES PATENT OFFICE 2,507,776

DRILL BIT

Walter C. Francis, Houston, Tex., assignor to Reed Roller Bit Company, Houston, Tex., a corporation of Texas Application September 3, 1946, Serial No. 694,583

2 Claims. (Cl. 255—71)

This invention relates generally to deep well drilling apparatus and specifically to roller bits. It will be found particularly useful in deep well drill bits of the cone cutter type.

The conventional cone bit includes a bit head having a recess in its bottom and two or three cutter spindles extending downwardly and inwardly into said recess. Substantially conical roller cutters are rotatably mounted on these spindles.

These cutters which enclose the spindles, have been heretofore rotatably locked on the spindles by balls fitting in raceways in the spindle and the cutter, the balls being insertable into the raceways through a bore in the cutter.

It is most important that the cutter be not weakened by cutting the bore therein through which the balls may be inserted, and this invention has for its general object the provision of a new and improved bit of this type in which the balls may be inserted through the cutter without objectionably weakening the same.

Other objects will hereinafter appear.

Figure 1:
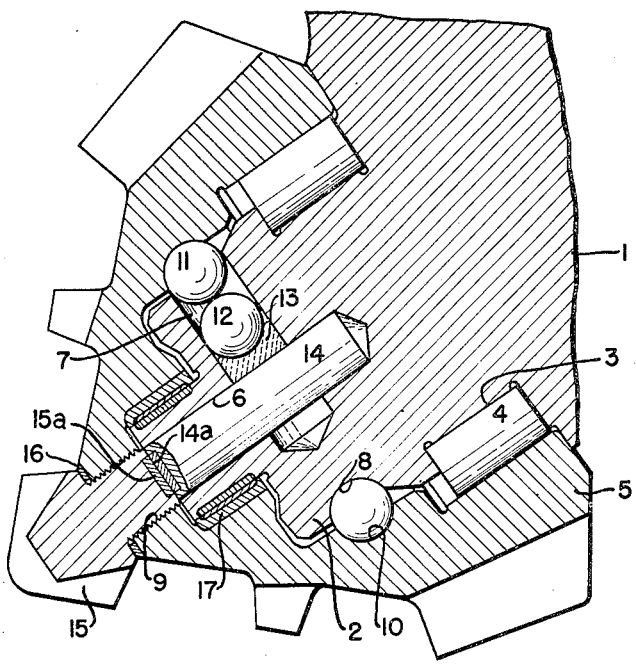
Figure 2:
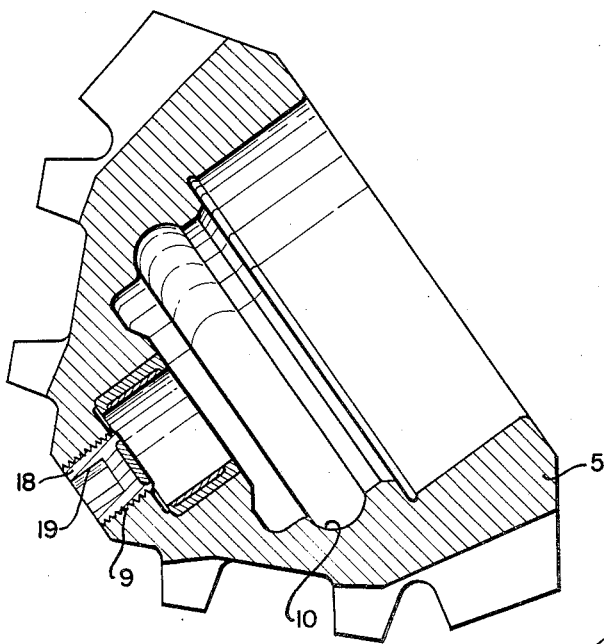

The preferred embodiment of the invention is illustrated in the accompanying drawings in which Fig. 1 is a fragmentary sectional elevation showing a cutter mounted on the spindle of a head; and Fig. 2 is a sectional elevation of a cutter with a modified point.

In the drawings the bit head is indicated at 1 and the cutter spindle at 2. The cutter spindle may be provided with a roller raceway 3 for the reception of rollers 4 to take the radial load when the bit is in operation. The cutter is indicated at 5.

In the preferred embodiment of the present invention the spindle 2 is provided with an axial bore 6 extending from its end, and a transverse bore 7 extending from the axial bore 6 to a raceway 8 in the spindle. The cutter 5 is provided with an axial threaded opening 9 in its point and a ball raceway 10. Within the spindle raceway 9 and cutter raceway 10 are balls 11 and within the transverse bore 7 is a ball 12. The ball 12 is supported by a plug 13, and the plug is supported in turn by the pin 14, the pin being held in place by a toothed point 15 threaded in the opening 9. The pin 14 may be provided with hard-surfacing material 14a and the point 15 with hard-surfacing material 15a and a shim of relatively soft material 16 may be interposed between the point 15 and the point portion of the cutter 5. The numeral 17 indicates suitable hard-surfacing material which may be employed between the reduced portion of the spindle 2 and the adjacent portion of the cutter.

The assembly of the parts disclosed by Fig. 1 may be effected as follows: The rollers 4 having been placed in the raceway 3, the cutter 5 with the point 15 removed may be placed upon the spindle 2. The balls 11 may then be inserted through the opening 9 in the point of the cutter, through the axial bore 6 in the spindle, through the transverse bore 7 in the spindle, into the raceways 8 and 10. The ball 12 may then be inserted through the opening 9 and axial bore 6 into the transverse bore 7 into contact with the adjacent ball 11. The plug 13, which may be made of any suitable material which hardens quickly may then be inserted while relatively soft through the opening 9 in the cutter and through the axial bore 6 in the spindle into the transverse bore 7 in the spindle to hold the ball 13 in place. Then the pin 14 may be inserted in the axial bore 6 to hold the plug 13 in place, and finally the point 15 may be screwed into the opening 9 in the cutter to hold the pin 14 in place.

In Fig. 2 the construction of the cutter is the same as that shown in Fig. 1 except that instead of using a toothed point 15, a closure 18 is threaded into the opening 9. This closure 18 may be provided with a hex-hole 19 so that it may be conveniently screwed into place. The conventional cone bit including three cutters for example is often constructed so that only one of the cutters has a cutting point. In such a bit the construction of Fig. 1 will provide the cutter with the cutting point and the construction of Fig. 2 may be used to provide the other two cutters.

The hard-surfacing inserts 14a and 15a in the pin 17 and point 15 respectively are provided to resist the wear incident to the relative rotation of these parts. The soft shim 16 is provided to eliminate the necessity for precision work that would otherwise be necessary in causing the point 15 to bear against the point portion of the cutter 5 and the point 15 to hold the pin 14 snugly in place.

It will be apparent from the foregoing that the assembly of the parts may be quickly and easily effected and that the axial opening 9 in the point of the cutter 5 is so disposed that the cutter 5 is not objectionably weakened.

The invention is not limited to the specific embodiment herein disclosed. Changes within the scope of the following claims will occur to those skilled in the art.

I claim:

1. A roller bit having a head, said head having a spindle with an external raceway; and a substantially conical roller cutter on said spindle and having an internal raceway; and the balls on said raceways to rotatably lock said cutter on said spindle; said spindle having an axial bore in the point thereof and a transverse bore leading from said axial bore to the raceway of said spindle; said cutter having an axial threaded opening in its point through which the balls may be inserted into said spindle bores and thence into said raceways; a ball in the transverse bore of said spindle, a plug to support said ball in contact with the adjacent ball in said raceways; and a pin in said axial bore to support said plug; said cutter having a toothed point threaded in said opening in its point to support said pin.

2. A roller bit having a head, said head having a spindle with an external raceway; and a substantially conical roller cutter on said spindle and having an internal raceway; and balls in said raceways to rotatably lock said cutter on said spindle; said spindle having an axial bore in the point thereof and a transverse bore leading from said axial bore to the raceway of said spindle; said cutter having an axial opening in its point through which the balls may be inserted into said spindle bores and thence into said raceways; means in the transverse bore of said spindle to hold said balls in said raceways; and a pin in said axial bore to support said means; said cutter having a part insertable in said opening in its point portion to support said pin.

WALTER C. FRANCIS.

REFERENCES CITED

The following references are of record in the file of this patent:

UNITED STATES PATENTS

| Number | Name | Date |
|---|---|---|
| 1,779,587 | Childs | Oct. 28, 1930 |
| 1,918,902 | Fletcher et al. | July 18, 1933 |